US008769512B2

(12) United States Patent
Partridge et al.

(10) Patent No.: US 8,769,512 B2
(45) Date of Patent: Jul. 1, 2014

(54) ADDING INSTRUMENTATION TO A BODY OF CODE TO ENABLE GENERATION OF CODE COVERAGE DATA

(75) Inventors: Ian O. Partridge, Eastleigh (GB); Adam J. Pilkington, Eastleigh (GB); David S. Renshaw, Winchester (GB); Andrew Taylor, Winchester (GB)

(73) Assignee: International Business Machines Corporation, Armonk, NY (US)

( * ) Notice: Subject to any disclaimer, the term of this patent is extended or adjusted under 35 U.S.C. 154(b) by 37 days.

(21) Appl. No.: 13/428,405

(22) Filed: Mar. 23, 2012

(65) Prior Publication Data

US 2012/0246627 A1 Sep. 27, 2012

(30) Foreign Application Priority Data

Mar. 24, 2011 (EP) .................................... 11159651

(51) Int. Cl.
*G06F 9/44* (2006.01)
*G06F 9/45* (2006.01)
*G06F 9/46* (2006.01)
*G06F 11/30* (2006.01)
*G06F 11/36* (2006.01)

(52) U.S. Cl.
CPC .......... *G06F 8/4441* (2013.01); *G06F 11/3636* (2013.01); *G06F 11/3624* (2013.01); *G06F 11/3089* (2013.01); *G06F 11/301* (2013.01); *G06F 11/366* (2013.01); *G06F 11/3676* (2013.01)
USPC ........... 717/151; 717/128; 717/130; 717/153; 717/154; 718/102

(58) Field of Classification Search
None
See application file for complete search history.

(56) References Cited

U.S. PATENT DOCUMENTS

| | | | |
|---|---|---|---|
| 7,089,535 B2 | 8/2006 | Bates et al. | |
| 7,530,057 B2 | 5/2009 | Babcock | |
| 8,359,496 B1* | 1/2013 | Bornstein et al. | 714/45 |
| 2006/0048114 A1* | 3/2006 | Schmidt | 717/148 |
| 2007/0168998 A1 | 7/2007 | Mehta et al. | |
| 2009/0150890 A1* | 6/2009 | Yourst | 718/102 |
| 2009/0249044 A1 | 10/2009 | Citron et al. | |
| 2010/0153935 A1* | 6/2010 | Porras et al. | 717/146 |
| 2010/0251226 A1* | 9/2010 | Sato et al. | 717/146 |
| 2010/0275185 A1* | 10/2010 | Burton et al. | 717/130 |
| 2011/0154002 A1* | 6/2011 | Liu et al. | 712/234 |
| 2011/0314452 A1* | 12/2011 | Tillmann | 717/128 |
| 2012/0030659 A1* | 2/2012 | Porras et al. | 717/151 |

OTHER PUBLICATIONS

Tikir, Mustafa M. et al., Efficient Instrumentation for Code Coverage Testing, Proceedings of the ACM SIGSOFT 2002 International Symposium on Software Testing and Analysis, 2002, p. 86-96, Association for Computing Machinery, College Park MD USA.

* cited by examiner

*Primary Examiner* — Don Wong
*Assistant Examiner* — Mohammad Kabir
(74) *Attorney, Agent, or Firm* — Jordan IP Law, LLC (57) ABSTRACT

A method apparatus and computer program product is disclosed for adding instrumentation to a body of code to enable generation of code coverage data for said body of code in which used instrumentation code is arranged to be optimized out by a compiler.

15 Claims, 6 Drawing Sheets

Figure 1

```
public class Foo {
    public int doStuff() {
        int x = 0;
        x++;
        if (x > 0) {
            System.out.println("Bar");
        }
        return x;
    }
}
```

Figure 2a

```
public class Foo { private static boolean[] coverageData = boolean[2];

public int doStuff() {
        coverageData[0] = true;
        int x = 0;
        x++;
        if (x > 0) {
            coverageData[1] = true;
            System.out.println("Bar");
        }
        return x;
    } public static boolean hasCoverageData() {
        return coverageData.length>0;
    }

ADDING INSTRUMENTATION TO A BODY OF CODE TO ENABLE GENERATION OF CODE COVERAGE DATA

BACKGROUND

Embodiments of the present invention relate to a method, apparatus and computer program product for adding instrumentation to a body of code to enable generation of code coverage data.

In IT systems engineering, testing is normally conducted on a software system being built. Part of the testing procedure may involve establishing code coverage data for the performed testing. Code coverage tools commonly rely on upfront modification to the code, or on-the-fly instrumentation of the code. Such procedures insert additional instructions in the code to detect when code sections such as statements, blocks, functions or methods, have been processed or executed. This approach can be computationally costly as additional code paths are inserted and additional input and output (IO) operations are required to log the collected coverage data for subsequent analysis.

The process of adding instrumentation to a body of code to gather metrics is commonly a one-off operation or performed relatively infrequently. Nevertheless, such instrumentation is a time consuming and thus costly process. Furthermore, the added instrumentation code affects the running of the program code itself because code processing timings are changed and performance impacted by the additional processing.

BRIEF SUMMARY

An embodiment of the invention provides a method for adding instrumentation to a body of code to enable generation of code coverage data for the body of code, the method comprising the steps of identifying one or more code sections in a body of code for adding instrumentation so as to determine whether or not the code sections are covered during subsequent processing of the body of code, associating a data structure with the body of code, the data structure comprising one or more data elements, each data element corresponding exclusively to one of the code sections and each data element being settable between an first state indicating that the corresponding code section has not been processed and a second state indicating that the corresponding code section has been processed, and associating a unique code element with each code section, the code element being arranged when processed to set the data element corresponding exclusively to the code section into the second state so as to indicate that the code section has been processed, the unique code element being further arranged, having set the exclusively corresponding data element to the second state, for removal during subsequent optimization of the body of code.

One or more of the unique code elements may be automatically inserted in the body of code. One or more of the unique code elements may be associated with one of a predetermined set of one or more code constructs in the body of code. The data structure may comprise a bitmap.

The method may comprise the further step of associating a further code element with the body of code, the further code element being arranged to prevent removal of the data structure during subsequent optimization of the body of code when all of the data elements are set to the second state.

The data structure may be arranged to be exclusively modifiable by the unique code elements. The state of the data elements of the data structure may be extracted as code coverage data for the body of code after processing of the body of code, the code coverage data indicating the code sections that have been covered and the code sections that have not been covered during the processing. The processing of the body of code may be performed by a virtual machine and the coverage data is extracted from a core dump for the virtual machine. The coverage data may be displayed to a user in association with the body of code so as to indicate which code sections have been processed and which code sections have not been processed.

Another embodiment provides apparatus for adding instrumentation to a body of code to enable generation of code coverage data for the body of code, the apparatus being operable to identify one or more code sections in a body of code for adding instrumentation so as to determine whether or not the code sections are covered during subsequent processing of the body of code, associate a data structure with the body of code, the data structure comprising one or more data elements, each data element corresponding exclusively to one of the code sections and each data element being settable between an first state indicating that the corresponding code section has not been processed and a second state indicating that the corresponding code section has been processed, and associate a unique code element with each code section, the code element being arranged when processed to set the data element corresponding exclusively to the code section into the second state so as to indicate that the code section has been processed, the unique code element being further arranged, having set the exclusively corresponding data element to the second state, for removal during subsequent optimization of the body of code.

A further embodiment provides a computer program stored on a computer readable medium and loadable into the internal memory of a computer, comprising one or more software code portions comprising a data structure associated with the program, the data structure comprising one or more data elements, each data element corresponding exclusively to a code section of the program and each data element being settable from a first state indicating that the corresponding code section has not been processed to a second state indicating that the corresponding code section has been processed, and one or more unique code elements each associated with one of the code sections of the program, the code elements being arranged when processed by the running of the program to set only the data element corresponding exclusively to the code section into the second state so as to indicate that the code section has been processed, the code elements being further arranged, having set the exclusively corresponding data element to the second state, for removal during subsequent optimization of the program.

Another embodiment provides a computer program stored on a computer readable medium and loadable into the internal memory of a computer, comprising software code portions arranged, when the program is run on a computer, for performing a method for adding instrumentation to a body of code to enable generation of code coverage data for the body of code, the method comprising the steps of identifying one or more code sections in a body of code for adding instrumentation so as to determine whether or not the code sections are covered during subsequent processing of the body of code, associating a data structure with the body of code, the data structure comprising one or more data elements, each data element corresponding exclusively to one of the code sections and each data element being settable between an first state indicating that the corresponding code section has not been processed and a second state indicating that the corresponding code section has been processed, and associating a unique code element with each code section, the code element being arranged when processed to set the data element corresponding exclusively to the code section into the second state so as to indicate that the code section has been processed, the unique code element being further arranged, having set the exclusively corresponding data element to the second state, for removal during subsequent optimization of the body of code

BRIEF DESCRIPTION OF THE DRAWINGS

Embodiments of the invention will now be described, by way of example only, with reference to the accompanying drawings in which.

DETAILED DESCRIPTION OF EMBODIMENTS OF THE INVENTION

Figure 1:
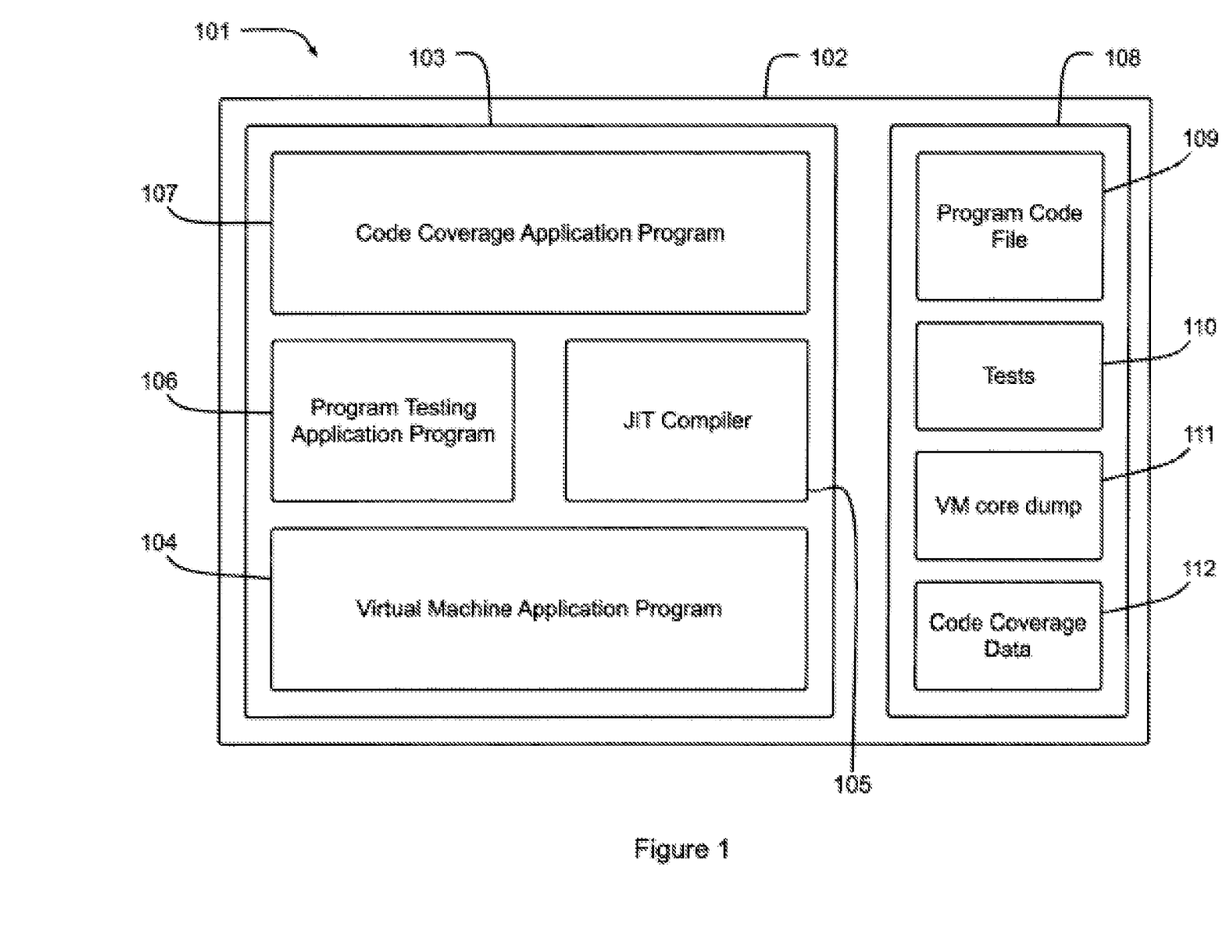
FIG. 1 is a schematic illustration of a computer system comprising a code coverage application program, a compiler and a virtual machine application program.

With reference to FIG. 1, a computer system 101 comprises a computer 102 loaded with an operating system 103 arranged to provide a platform for running one or more application programs. In the present embodiment, the computer 102 is loaded with a virtual machine (VM) application program 104, a just-in-time (JIT) compiler application program 105, a program testing application program 106 and a code coverage (CC) application program 107. The computer 102 further comprises a storage device 108, which, in the present embodiment, is used for storing a program code file 109, a set of tests 110, VM core dump data 111 and code coverage (CC) data 112.

The virtual machine (VM) application program 104 is arranged to provide one or more virtual machines for processing the program provided by the program code file 109. The just-in-time (JIT) compiler application program 105 is arranged to compile the program code 109 for processing by a VM generated by the VM application program 104. The program testing application program 106 is arranged to run the tests 110 against the program code 109 to determine whether or not it is functioning as designed. The code coverage application program 107 is arranged to enable a user to instrument the program code 109 so as to determine the coverage of the program code 109 by the tests 110. In response to the running of the instrumented program code 109 against the tests 110, the instrumentation added by the code coverage application program 107 is arranged to generate the code coverage data 112. The code coverage data 112 is arranged to identify the portions of the program code 109 covered by the processing of the tests 110. In the present embodiment, the code coverage application program 107 is further arranged to display the code coverage data 112 to a user in association with the program code 109.

Figure 2A:
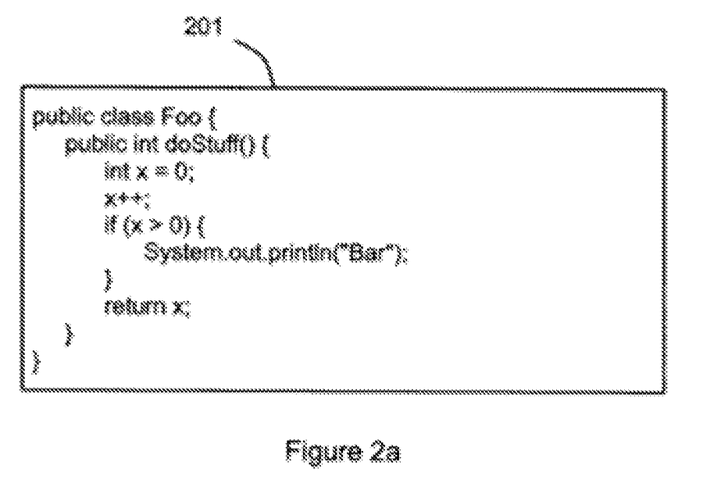
FIG. 2a is an example of a body of code for a computer program prior to being processed by the code coverage application program of FIG. 1.
Figure 2B:
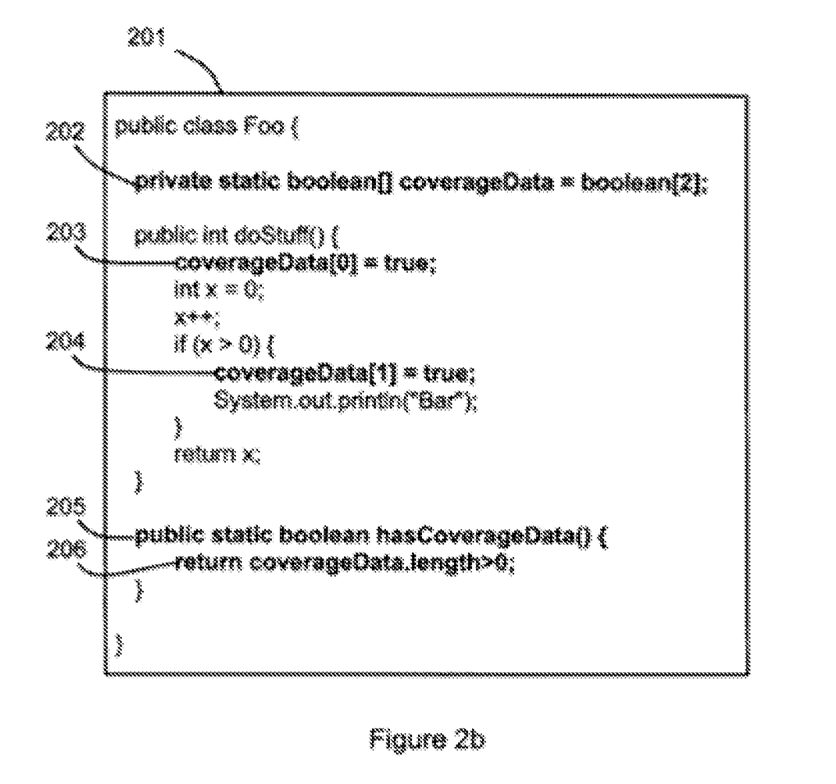
FIG. 2b is an example of a body of code for a computer program comprising instrumentation inserted by the code coverage application program of FIG. 1.

FIG. 2a shows a body of code 201 from the program code 109 prior to its instrumentation by the code coverage application program 107. In the present embodiment, the program code 109 is written in the Java™ programming language. With reference to FIG. 2b, once the instrumented, the body of code 201 comprises an additional data structure 202 and a plurality of additional code elements 203, 204 in the form of instrumentation points. The body of code 201 further comprises further code elements 205, 206.

The data structure 202, in the form of a bitmap, is arranged for recoding coverage data corresponding to each of the instrumentation points 203, 204. The bitmap 202 comprises an array of elements that each exclusively correspond to one of the instrumentation points 203, 204. All the bits of the bitmap are initially set to a first state on insertion of the data structure in the body of code 201. In the present embodiment, the first state is arranged to indicate that the code section associated with the respective instrumentation point 203, 204 has not been processed. In the present embodiment, the bitmap 202 is defined as private and static so that the coverage data collection process operates at a class level not at an instance level.

Each of the instrumentation points 203, 204 is arranged to exclusively set a respective bit in the bitmap 202 to a second state in response to being processed. The second state of the bits of the bitmap 202 is arranged to indicate that the code section associated with the respective instrumentation point 203, 204 has been processed. In the present embodiment, the code section associated with the respective instrumentation point 203, 204 comprises the section of code preceding a given instrumentation point back to the next instrumentation point or the start of the body of code 201.

In the present embodiment, the compiler 105 is arranged to compile the program code 109 just-in-time (JIT) for its processing by a VM provided by the VM application program 104. In addition, the compiler 105 is arranged to optimize the program code 109 as part of the compilation process. One such optimization is to remove code elements that no longer perform any function, by a process commonly referred to as escape analysis. For example, if a code element attempts to make an ineffectual change to data or to change non-existent or fixed data, then that code element may be removed without any adverse effect on the processing of the overall program. Such optimizations are arranged to make processing more efficient.

In the present embodiment, the first state of the bits of the bitmap 202 is represented by a logical zero and the second state is represented by a logical one. The instrumentation points 203, 204 are arranged to exclusively set the respective bit of the bitmap 202 from zero to one. No other changes are permitted to the bitmap 202 so as to preserve its data. As a result, in the present embodiment, once the instrumentation code 203, 204 has set the respective bit of the bitmap 202 from zero to one, the respective instrumentation code 203, 204 no longer has any effect in subsequent processing of the program code 109 and can thus be removed or optimized out by the compiler 105 during its compilation.

The further code elements 205, 206, comprise pinning code, that is, code arranged to prevent removal of the data structure 202 by a code optimization function of a compiler once all of its data elements have been set to the second state. Thus, even once all of the bits of the bitmap 202 have been set, the bitmap 202 and its data are preserved in the body of code 201. In the present embodiment, the pinning code comprises a method 205, which accesses the data structure 202 and returns its length, coupled with a call 206 to the method. Since the call 206 always returns meaningful data from the data structure, this ensures that the pinning code and the data structure 202 are not removed by a code-optimizing function of the compiler 105.

In the present embodiment, the VM application program creates Java™ VMs (JVMs) each having a single class loader and no class unloading. As a result, all loaded classes for a given JVM are available in memory when the JVM shuts down. In the present embodiment, the code coverage (CC) application program 107 is arranged to save a VM core dump 111 when a relevant JVM shuts down. The core dump 111 contains the data structure 202 and its data, which is then extracted by the CC application program 107 and saved as the code coverage data 112. The CC application program 107 is then arranged to display the code coverage data 112 to the user. In the present embodiment, the CC application program 107 is arranged to display the contents of the program code file 109 to the user via a code editor with the code coverage data 112 indicated by displaying covered instrumentation code 203, 204 in green and non-covered instrumentation code 203, 204 in red.

Figure 3:
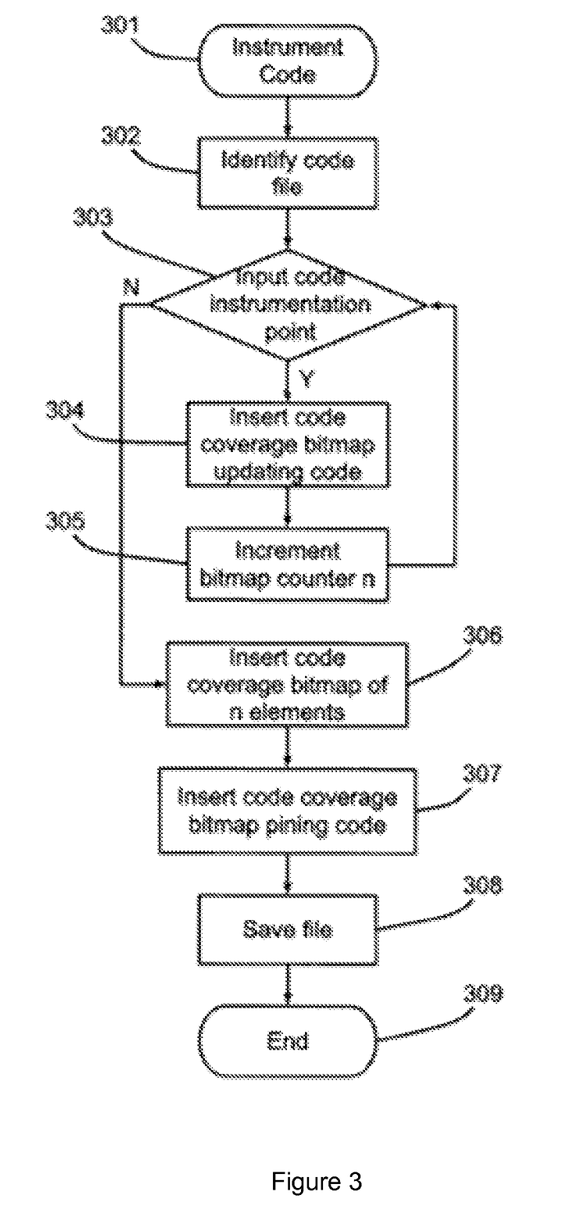
FIG. 3 is a flow chart illustrating the processing performed by the code coverage application program of FIG. 1 when adding instrumentation to a body of code.

The processing performed by the CC application program 107 when augmenting the program code file 109 with instrumentation code 202, 203, 204, 205, 206 will now be described in further detail with reference to the flow chart of FIG. 3. At step 301, processing is initiated in response to a user command to instrument the code file 109 and processing moves to step 302. At step 302, the relevant code file 109 is identified and processing moves to step 303. At step 303, the user is queried as to whether or not to input a first element of instrumentation code 203 and in response to the user indicating that a first element of instrumentation code 203 should be added processing moves to step 304. At step 304 an element of instrumentation code 203, 204 is added to the program code 109 at a position indicated by the user and processing moves to step 305. At step 305, a bitmap counter n initially set to zero is incremented by one and processing returns to step 303. At step 303, if the user indicates that a further element of instrumentation code 204 is required then processing continues to step 304 and proceeds as described above. If at step 303 the user indicates that no further instrumentation code is required then processing moves to step 306. At step 306, the data structure 202, in the form of a code coverage bitmap having n elements, is inserted into the program code file 109 and processing moves to step 307. At step 307, the pinning code 205, 206 is inserted into the program code file 109 and processing moves to step 308. At step 308 the instrumented program code file 109 is saved and processing moves to step 309 and ends.

Figure 4:
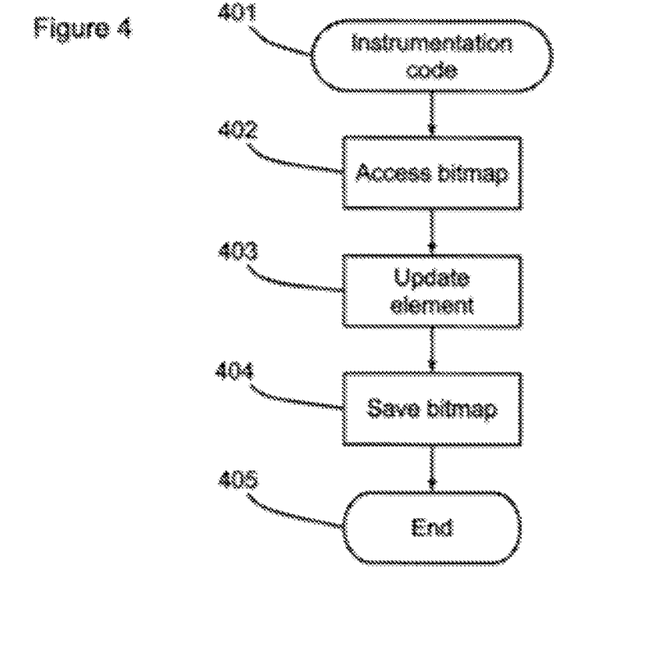
FIG. 4 is a flow chart illustrating the processing performed by instrumentation code, added by the code coverage application program of FIG. 1, when processed in a virtual machine provided by the virtual machine application program of FIG. 1.

The processing performed by a VM provided by the VM application program 104 when an element of instrumentation code 203, 204 is encountered during processing of the program code 109 will now be described with reference to the flow chart of FIG. 4. Processing is initiated at step 401 in response to processing encountering an element of instrumentation code 203, 204 and processing moves to step 402. At step 402, the bitmap 202 is accessed and processing moves to step 403. At step 403, the element of the bitmap 202 with which the given element of instrumentation code 203, 204 is exclusively associated is set to one and processing moves to step 404. At step 404 the bitmap 202 is saved and processing moves to step 405 and ends.

Figure 5:
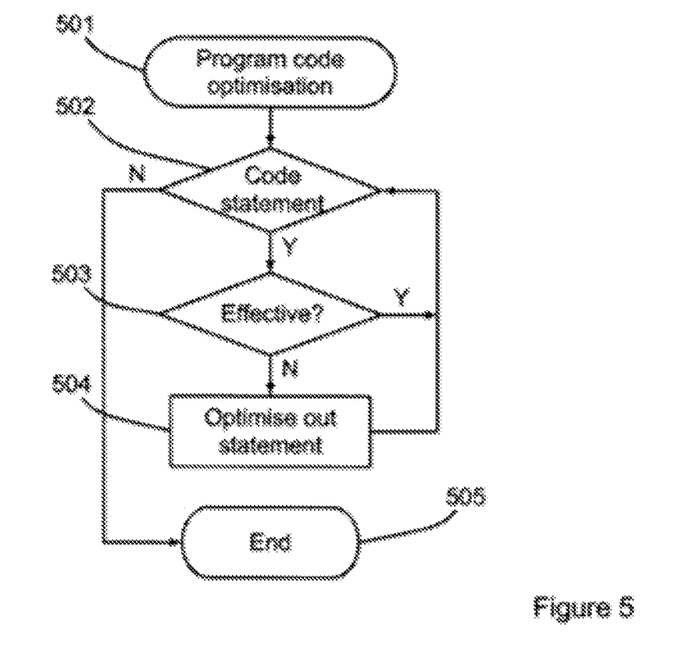
FIG. 5 is a flow chart illustrating the processing performed by the compiler of FIG. 1 when compiling a body of code for processing in the virtual machine application program.

The processing performed by the compiler 105 when optimizing the program code 109 during compilation for processing by a VM provided by the VM application program 104 will now be described with reference to the flow chart of FIG. 5. Processing is initiated at step 501 in response to the initiation of the compilation process with the optimization function enabled and processing moves to step 502. At step 502, each statement of the code is checked as it is processed by the main compiler function to determine whether or not the statement references a data structure and if so processing moves to step 503. At step 503, the existence of referenced data structure is established and whether the statement can modify its data is also determined. If the data structure does not exist or cannot be modified then processing moves to step 504. At step 504 the statement is optimized out of the compiled code and processing returns to step 502 and proceeds as described above. Similarly, if at step 503 the statement is effective, in that it operates to modify data of and exiting data structure, then processing returns to step 502 and proceeds as described above. If at step 502 all statements have been processed then processing moves to step 505 and ends.

Figure 6:
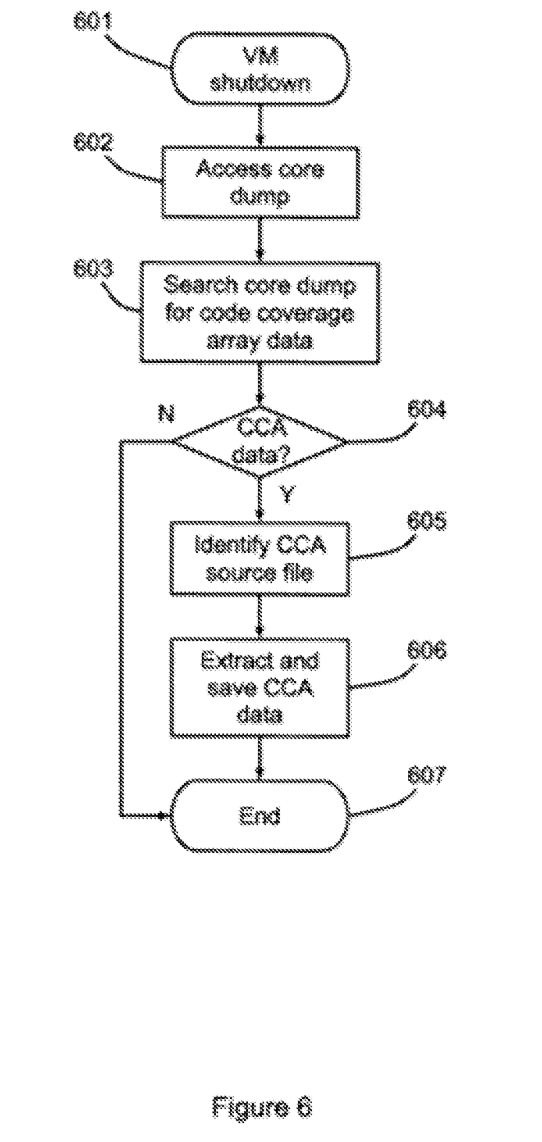
FIG. 6 is a flow chart illustrating the processing performed by the code coverage application program of FIG. 1 in response to the completion of the processing of an instrumented body of code in the virtual machine application program.

The processing performed by the CC application program 107 in response to the shutting down of a VM provided by the VM application program 104 will now be described in further detail with reference to the flow chart of FIG. 6. Processing is initiated at step 601 by the detection of the completion of processing of a VM running instrumented program code 109 and processing moves to step 602. At step 602, a core dump 111 for the VM is retrieved and processing moves to step 603. At step 603 the core dump file 111 is searched to identify any bitmaps 202 present and processing moves to step 604. At step 604, if one or more bitmaps 202 have been identified then processing moves to step 605. At step 605 the program code file 109 relevant to each identified bitmap 202 is identified and processing moves to step 606. At step 606 the code coverage data 112 is extracted from the bitmaps 202 and saved and processing moves to step 607 and ends. If at step 604 no bitmaps 202 are identified in the core dump 111 then processing moves to step 607 and ends.

Figure 7:
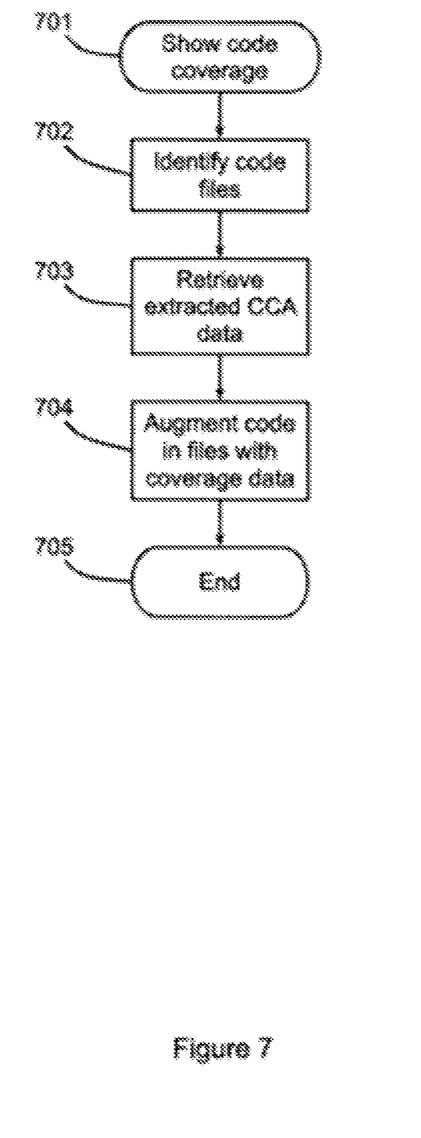
FIG. 7 is a flow chart illustrating the processing performed by the code coverage application program of FIG. 1 to retrieve and display code coverage data generated during the processing of a body of code in the virtual machine application program.

The processing performed by the CC application program 107 in response to a user instruction to display the code coverage data 112 for a given program code file 109 will now be described in further detail with reference to the flow chart of FIG. 7. Processing is initiated at step 701 in response to a user instruction to display the code coverage data 112 for a given program code file 109 and processing moves to step 702. At step 702, the program code file 109 is identified and processing moves to step 703. At step 703 the relevant code coverage data 112 is retrieved and processing moves to step 704. At step 704 the program code file 109 is displayed to the user augmented with the code coverage data 112 in a predetermined manner so as to illustrate the code coverage to the user. Processing then moves to step 705 and ends.

In the embodiment described above, the JVMs created by the VM application program comprise a single class loader and do not perform class unloading. Thus all loaded classes are be available in memory when the JVM shuts down and are present in the core dump file saved at the end of the processing of a given JVM. In another embodiment, the JVM performs class unloading and comprises one or more class loaders. In this embodiment, the separate sets of code coverage data generated by each class are collected by additional functionality provided by each of the class unloaders. This collected data is then amalgamated with the core dump file saved on shutdown of the relevant VM.

Embodiments of the invention minimize the impact of the collection of code coverage data since instead of the data being written to disk as it is created, the code coverage data is collected in bulk at the end of the processing of the relevant program code. For example, for Java™ and related programs the code coverage data may be collected in bulk on a per-class basis when the relevant class is unloaded or otherwise destroyed. Alternatively, as described above, the code coverage data may be extracted en-masse from a core dump of the memory when the relevant processing is shut down.

In a further embodiment, the code coverage application program is arranged to automatically add instrumentation code elements to the program code. The instrumentation code may be automatically associated with a predetermined set of one or more code constructs. A set of rules may be used to identify appropriate points for insertion of the instrumentation code elements.

As will be understood by those skilled in the art, the optimization function of the compiler described herein is a standard optimization function referred to as escape analysis commonly provided by JIT compilers. In another embodiment the complier is a generally non-optimizing compiler with added code removal functionality arranged to remove the used code coverage instrumentation code described herein. For example, the code coverage instrumentation elements may be identified by a predetermined instrumentation code identifier arranged to trigger the code removal functionality.

As will be understood by those skilled in the art, while the invention has been described in relation to a JIT compiler, embodiments of the invention may utilize ahead-of-time compilers with appropriate inbuilt or additional optimization functionality as described above.

It will be understood by those skilled in the art that the apparatus that embodies a part or all of the present invention may be a general purpose device having software arranged to provide a part or all of an embodiment of the invention. The device could be a single device or a group of devices and the software could be a single program or a set of programs. Furthermore, any or all of the software used to implement the invention can be communicated via any suitable transmission or storage means so that the software can be loaded onto one or more devices.

While the present invention has been illustrated by the description of the embodiments thereof, and while the embodiments have been described in considerable detail, it is not the intention of the applicant to restrict or in any way limit the scope of the appended claims to such detail. Additional advantages and modifications will readily appear to those skilled in the art. Therefore, the invention in its broader aspects is not limited to the specific details of the representative apparatus and method, and illustrative examples shown and described. Accordingly, departures may be made from such details without departure from the spirit or scope of applicant's general inventive concept.

We claim:

1. A method for adding instrumentation to a body of code to enable generation of code coverage data for said body of code, said method comprising the steps of:

identifying one or more code sections in a body of code for adding instrumentation so as to determine whether or not said code sections are covered during subsequent processing of said body of code;

associating a data structure with said body of code, said data structure comprising one or more data elements, each said data element corresponding exclusively to one of said code sections and each said data element being settable between a first state indicating that said corresponding code section has not been processed and a second state indicating that said corresponding code section has been processed;

associating a unique code element with each said code section, said code element being arranged when processed to set said data element corresponding exclusively to said code section into said second state so as to indicate that said code section has been processed, said unique code element being further arranged, having set said exclusively corresponding data element to said second state, for removal during subsequent optimization of said body of code;

automatically inserting one or more of said unique code elements in said body of code; and associating a further code element with said body of code, said further code element being arranged to prevent removal of said data structure during subsequent optimization of said body of code when all of said data elements are set to said second state.

2. The method according to claim 1, in which one or more of said unique code elements are associated with one of a predetermined set of one or more code constructs in said body of code.

3. The method according to claim 1, in which said data structure comprises a bitmap.

4. The method according to claim 1, in which said data structure is arranged to be exclusively modifiable by said unique code elements.

5. The method according to claim 1, in which the state of said data elements of said data structure is extracted as code coverage data for said body of code after processing of said body of code, said code coverage data indicating said code sections that have been covered and said code sections that have not been covered during said processing.

6. The method according to claim 5, in which said processing of said body of code is performed by a virtual machine and said coverage data is extracted from a core dump for said virtual machine.

7. The method according to claim 5, in which said coverage data is displayed to a user in association with said body of code so as to indicate which code sections have been processed and which code sections have not been processed.

8. An apparatus to add instrumentation to a body of code to enable generation of code coverage data for said body of code, said apparatus comprising:

a processor; and a memory comprising instructions executable by the processor, the instructions including:

first logic to identify one or more code sections in a body of code for adding instrumentation so as to determine whether or not said code sections are covered during subsequent processing of said body of code;

second logic to associate a data structure with said body of code, said data structure comprising one or more data elements, each said data element corresponding exclusively to one of said code sections and each said data element being settable between an first state indicating that said corresponding code section has not been processed and a second state indicating that said corresponding code section has been processed;

third logic to associate a unique code element with each said code section, said code element being arranged when processed to set said data element corresponding exclusively to said code section into said second state so as to indicate that said code section has been processed, said unique code element being further arranged, having set said exclusively corresponding data element to said second state, for removal during subsequent optimization of said body of code;

fourth logic to associate a further code element with said body of code, said further code element being arranged to prevent removal of said data structure during subsequent optimization of said body of code when all of said data elements are set to said second state; and wherein one or more of said unique code elements is automatically inserted in said body of code.

9. The apparatus according to any of claim 8, in which one or more of said unique code elements are associated with one of a predetermined set of one or more code constructs in said body of code.

10. The apparatus according to any of claim 8, in which said data structure comprises a bitmap.

11. The apparatus according to claim 8, in which said data structure is arranged to be exclusively modifiable by said unique code elements.

12. The apparatus according to claim 8, in which the state of said data elements of said data structure is extracted as code coverage data for said body of code after processing of said body of code, said code coverage data indicating said code sections that have been covered and said code sections that have not been covered during said processing.

13. The apparatus according to claim 12, in which said processing of said body of code is performed by a virtual machine and said coverage data is extracted from a core dump for said virtual machine.

14. The apparatus according to claim 12, in which said coverage data is displayed to a user in association with said body of code so as to indicate which code sections have been processed and which code sections have not been processed.

15. A computer program product comprising:

a non-transitory computer readable storage medium; and computer usable code stored on the computer readable storage medium, wherein the computer usable code includes;

a data structure associated with said computer usable code, said data structure comprising one or more data elements, each said data element corresponding exclusively to a code section of said computer usable code and each said data element being settable from a first state indicating that said corresponding code section has not been processed to a second state indicating that said corresponding code section has been processed; and one or more unique code elements each associated with one of said code sections of said computer usable code, said code elements being arranged when processed by the running of said computer usable code to set only said data element corresponding exclusively to said code section into said second state so as to indicate that said code section has been processed, said code elements being further arranged, having set said exclusively corresponding data element to said second state, for removal during subsequent optimization of said computer usable code, said code elements being further arranged to ensure that said data structure is not identifiable for removal during said subsequent optimization of said program.

* * * * *